United States Patent [19]

Miyajima

[11] Patent Number: 5,029,329
[45] Date of Patent: Jul. 2, 1991

[54] NC MACHINE TOOL CONTROL METHOD AND APPARATUS

[75] Inventor: Hiroyoshi Miyajima, Ueda, Japan

[73] Assignee: Kabushiki Kaisha Ocean Machinery, Tokyo, Japan

[21] Appl. No.: 289,703

[22] Filed: Dec. 27, 1988

[30] Foreign Application Priority Data

Feb. 19, 1988 [JP] Japan .................. 63-35049

[51] Int. Cl.⁵ .............................................. G06F 15/46
[52] U.S. Cl. ............................ 364/474.01; 364/474.22
[58] Field of Search ................... 364/474.01, 474.14, 364/474.2, 474.22, 171; 82/118; 355/45, 95; 901/3, 5

[56] References Cited

U.S. PATENT DOCUMENTS

| | | | |
|---|---|---|---|
| 3,557,350 | 1/1971 | Proctor | 235/151.11 |
| 4,120,583 | 10/1978 | Hyatt | 355/86 |
| 4,370,720 | 1/1983 | Hyatt | 364/474.36 |
| 4,421,140 | 12/1983 | Allen et al. | 139/1 E |
| 4,521,845 | 6/1985 | Schwefel | 364/171 |
| 4,723,207 | 2/1988 | Isobe et al. | 364/171 |

FOREIGN PATENT DOCUMENTS 43-1471 1/1968 Japan .

Primary Examiner—Jerry Smith
Assistant Examiner—Paul Gordon
Attorney, Agent, or Firm—Fleit, Jacobson, Cohn, Price, Holman & Stern

[57] ABSTRACT

An NC machine tool control method and apparatus controls an NC machine tool by a pulse synchronized with a revolution of a main spindle in a machining mode where a normal machining is performed in which a manually operated handle is rotated to generate a pulse of a selective speed in a test machining mode where a test machining is performed, in place of the pulse synchronized with a revolution of the main spindle, whereby the NC machine tool is controlled by the pulse generated by the manually operated handle. A test machining can be performed at a machining speed selectively controlled by changing a rotational speed of the manually operated handle. A sequence of machining steps can be selectively reversed by changing a rotational direction of the manually operated handle. Thus the NC machine tool is allowed to perform a test machining at a machining speed and in a sequence of machining steps freely selected by changing a rotational speed and a rotational direction of the manually operated handle.

8 Claims, 6 Drawing Sheets

FIG. 3

| TOOL POSITION | EXAMPLE 1 INCREMENT COMMAND | EXAMPLE 2 ABSOLUTE COMMAND | EXAMPLE 3 INCREMENT & ABSOLUTE COMMAND |
|---|---|---|---|
| 1 | G00    X47.0 Z3.0 | G00    X47.0 Z3.0 | G00    X47.0 Z3.0 |
| 2 | G99 G01   W-20.0 F0.1 | G99G01   Z-17.0 F0.1 | G99G01   W-20.0 F0.1 |
| 3 | U11.0<br>W-18.0 | X 58.0<br>Z-35.0 | X 58.0<br>W-18.0 |
| 4 | G98    U12.0     F200 | G98    X 70.0    F200 | G98    X 70.0    F200 |

FIG. 4

| | | |
|---|---|---|
| KIND OF FEED COMMAND | G98 | |
| KIND OF MACHINING OPERATIONS | G00(RAPID FEED) | |
| COODINATE VALUES | X=47.0 | BLOCK1 |
| | Z=3.0 | |
| SPEED | F=10000mm/min | |
| | G99 | |
| | G01(CUTTING FEED) | |
| | X=47.0 | BLOCK2 |
| | Z=17.0 | |
| | F=0.1mm/rev | |
| | G99 | |
| | G01(CUTTING FEED) | |
| | X=58.0 | BLOCK3 |
| | Z=-17.0 | |
| | F=0.1mm/rev | |
| | G99 | |
| | G01(CUTTING FEED) | |
| | X=58.0 | BLOCK4 |
| | Z=35.0 | |
| | F=0.1mm/rev | |
| | G98 | |
| | G01(CUTTING FEED) | |
| | X=70.0 | BLOCK5 |
| | Z=35.0 | |
| | F=200mm/min | |

```
G01(CUTTING FEED)
X = 47.0
Z = -17.0
F = 0.1mm/rev
```

FIG. 7

| TOOL POSITION | INCREMENT & ABSOLUTE COMMAND |
|---|---|
| 1 | G00    X30.0   Z 50.0<br>G99G02X50.0  Z 30.0  I 25.0   K0 F0.3 |
| 2 | G0i    X50.0  Z 0.0  F 0.1 |

FIG. 8

KIND OF MACHINING OPERATIONS  
COODINATE VALUES  
SPEED

```
G98
G00(RAPID FEED)
X = 30.0
Z = 50.0
F = 10000mm/min
```
} BLOCK 1

CENTER OF ARC

```
G99
G02(ARCURATE CUTTING)
X = 50.0
Z = 30.0
I = 25.0
K = 0
F = 0.3mm/rev
```
} BLOCK 2

```
G99
G01(CUTTING FEED)
X = 50.0
Z = 0.0
I = 0.1mm/rev
```
} BLOCK 3

FIG. 9

```
G03(ARCURATE CUTTING)
X = 15.0
Z = 50.0
I = 25.0
K = 0
F = 0.3mm/rev
```

NC MACHINE TOOL CONTROL METHOD AND APPARATUS

BACKGROUND OF THE INVENTION

This invention relates to an NC machine tool control method and apparatus for controlling an NC machine tool with a pulse synchronized with a revolution of a main spindle in a machining mode in which a normal machining is performed.

When a new workpiece having a specific configuration is machined by an NC machine tool, the following sequence of procedures is followed. First, a machining program for the NC machine tool machining the workpiece is prepared in accordance with the blueprints of the workpiece. Next, the NC machine tool is actuated for a test machining in order to check whether or not the machining program is correct. When the result of the test machining finds the program is incorrect, the machining program is corrected. Again a test machining is repeated in accordance with the corrected machining program to check whether or not the machining control has been made as intended. The machining program is completed, following such sequence of procedures. Then, in accordance with the completed machining program, the machine tool is automatically operated machine the workpiece.

The test machining is very important among the procedures of the sequence to check whether or not the machining program is correct.

The test machining is conventionally conducted by performing the steps of a machining program having a string of steps, sequentially one by one, or conducted at lower speed than the execution speed of the machining program.

But in such conventional test machining, the incorrect step of the machining program is actually carried out, with results that a cutting tool collides with the workpiece and unnatural forces are exerted on the cutting tool. This is a problem of the conventional test machining.

SUMMARY OF THE INVENTION

An object of this invention is to provide an NC machine tool control method and apparatus which can be so controlled that, even when a test machining is performed in accordance with a machining program including an incorrect step, the cutting tool may not collide with a workpiece, and no unnatural machining may be performed.

The object of this invention described above is achieved by an NC machine tool control method for controlling an NC machine tool by a pulse synchronized with a revolution of a main spindle in a machining mode where a normal machining is perfomed in which: a manually operated handle is rotated to generate a pulse of a selective speed in a test machining mode where a test machining is performed, in place of the pulse synchronized with a revolution of the main spindle, whereby the NC machine tool is controlled by the pulse generated by the manually operated handle.

The object of this invention described above is achieved by An NC machine tool control apparatus for controlling an NC machine tool by a pulse synchronized with a revolution of a main spindle in a machining mode where a normal machining is perfomed, comprising: a manually operated handle which is turned to generate a pulse at a selective speed; and switching means for switching to the pulse synchronized with a revolution of the main spindle in the machining mode and switching to the pulse generated by the manually operated handle in the test machining mode, the NC machine tool being controlled by either of the pulses selected by the switching means.

The NC machine tool control method or apparatus according to this invention enables a machining speed to be controlled for a test machining by changing a rotational speed of the manually operated handle and further machining steps to be reversed by changing a rotational direction of the manually operated handle. Thus, according to this invention, the NC machine tool can be controlled for a test machining by changing a rotational speed and a rotational direction of the manually operated handle. Consequently, even when a machining program having an incorrect step is tested, the proceeding of the test program can be stopped or is reversed for avoiding a collision of a cutting tool with a workpiece or an unnatural machining. This invention enables a machining to be performed safely and effectively.

BRIEF DESCRIPTION OF THE DRAWINGS

FIG. 3 is a view showing a machining program for the blueprint of FIG. 2;

FIG. 4 is a view showing command informations of the machining program of FIG. 3;

FIG. 7 is a view showing a machining program for the blueprint of FIG. 6;

FIG. 8 is a view showing the command informations of the machining program of FIG. 7; and FIG. 9 is a view showing the command informations for a reverse machining operation of the machining program of FIG. 7.

DETAILED DESCRIPTION OF THE INVENTION

Figure 1:
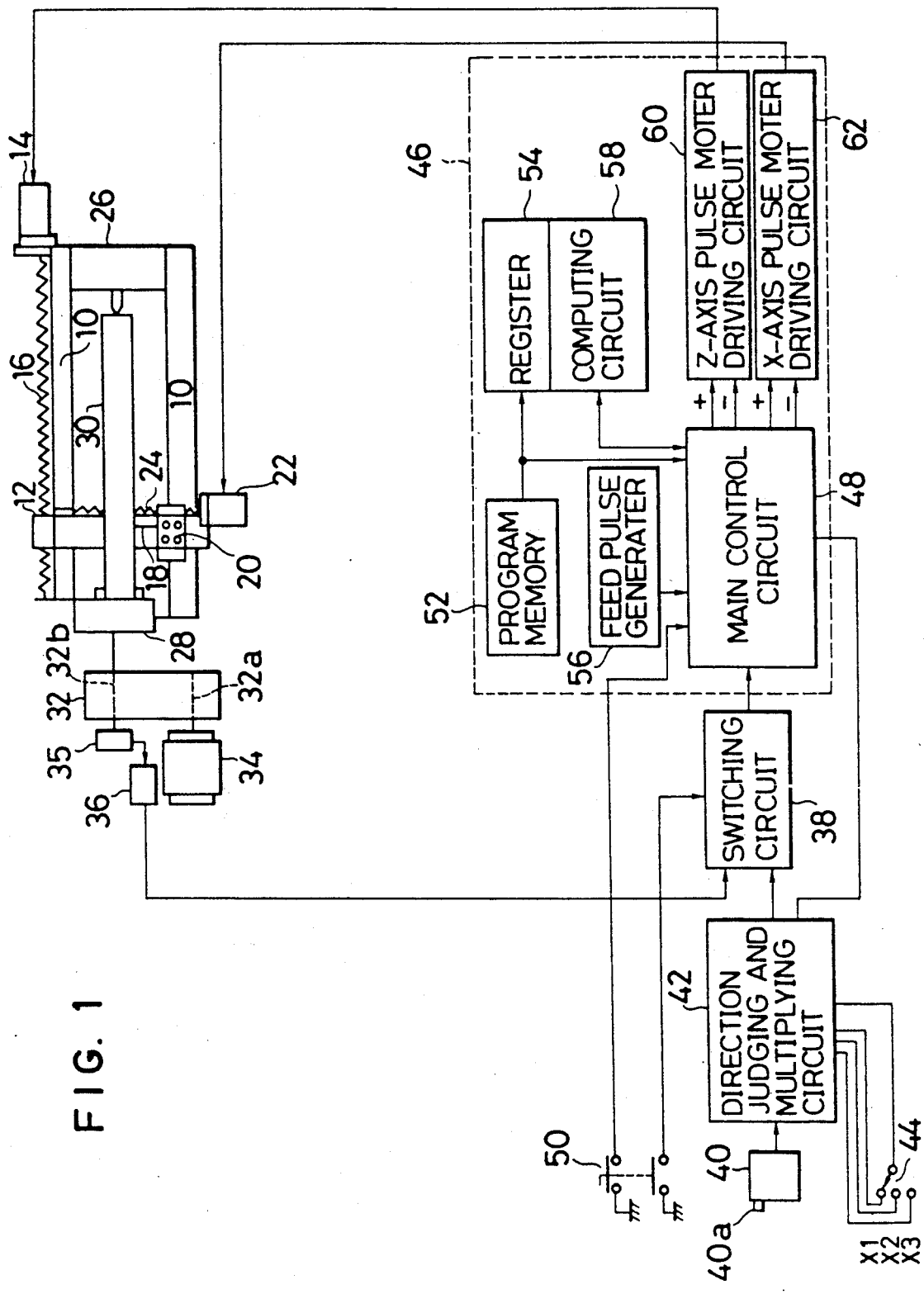
FIG. 1 is a view showing an NC machine tool control apparatus according to one embodiment of this invention.

FIG. 1 shows a control apparatus for use in an NC machine tool according to one embodiment of this invention. In this embodiment the NC machine tool is exemplified by an NC lathe.

In the NC lathe a saddle 12 mounted astride a bed 10 is moved by a Z axis feed screw 16 driven by a Z axis pulse motor 14 in the longitudinal direction of the bed 10. A cutting tool mount 20 supporting a cutting tool 18 is fed by an X axis feed screw 24 driven by an X axis pulse motor 22 in the direction orthogonal to that of movement of the saddle 12.

The bed 10 has a loose head stock 26 and a spindle head 28 provided respectively on both ends thereof. A workpiece 30 is mounted on the main spindle, supported by the loose head stock 26 and the spindle head 28. The spindle head 28 is connected to an output shaft 32b of a feed gear mechanism 32. An input shaft 32a of the feed gear mechanism 32 is connected to a spindle motor 34. The feed gear mechanism 32 is constituted by the input shaft 32a and the output shaft 32b, and a belt (not shown) wound on different diameter pulleys (not shown) provided respectively thereon. By selecting pulleys of suitable diameters, the spindle head 28, i.e., the workpiece 30 can be revolved at a required speed. A spindle revolutional position detector 35 is provided on one end of the output shaft 32b of the gear mechanism 32 and generates a spindle revolutional position detecting pulse corresponding to a revolutional position of the spindle (the output shaft 32b). The spindle revolutional position detecting pulse is amplified by an amplifier 36 to be outputted to a switching circuit 38.

On the other hand a manually operated handle 40 is provided for controlling a machining speed at which a test machining is performed. The manually operated handle 40 is rotated in a test machining mode by an operator turning the handle 40 with a knob 40a thereof, watching the machining conditions, and outputs a pulse corresponding to a rotational speed and a direction to a direction judging and multiplying circuit 42.

The direction judging and multiplying circuit 42 judges whether the manually operated handle 40 is rotated clockwise or counter clockwise and multiplies a pulse from the manually operated handle 40 corresponding to a set state of the multiplying switch 44. In this embodiment, the multiplying switch 44 is set at rates of once, twice and four times, and accordingly the machine tool can be controlled to a rotational speed of the manually operated handle 40 multiplied by one of the multiplying rates. The direction judging and multiplying circuit 42 supplies a pulse multiplied in accordance with a set state of the multiplying switch 44 to a switching circuit 38, and at the same time supplies a signal indicative of a rotational direction of the manually operated handle 40 to a central control circuit 48 of a numerical control unit 46.

The switching circuit 38 switches a main spindle revolutional position detecting pulse from the main spindle rotational position detector 35 and a pulse from the manually operated handle 40 to the main control circuit 48 of the numerical control unit 46.

A feed pulse generator 56 gives forth a pulse at a certain time interval to the main control circuit 48 of the numerical control unit 46.

The command informations to be supplied to the machine tool are stored in a program memory 52. The command informations include machining operation command informations, and feed amount command informations. The feed amount command informations are stored in a register 54, and the machining operation command informations are supplied to the main control circuit 48.

The feed amount command informations include a minutely feed amount command (G98: mm/min) which commands a timely feed amount, and a revolutional feed command (G99:mm/rev) which commands a feed amount per one revolution of the main spindle. For the minutely feed amount command (G98), control is based on a pulse from the pulse generator 56, and for the minutely revolutional feed amount command (G99), control is based on a pulse from the switching circuit 38.

An judgement is made as to how a current position deviates from a curve to be followed and which direction a feed is made in, based on a pulse from the pulse generator 56 or the switching circuit 38. This judgement is made by supplying a suitable control signal from the main control circuit 48 to the register 54 and a computing circuit 58.

A responsive pulse from the register or the computing circuit 58 is supplied to either one of a positive or a negative terminals of a Z axis pulse motor driving circuit 60 or an X axis pulse motor driving circuit 62. The Z axis pulse motor driving circuit 60 or the X axis pulse motor driving circuit 62 controls the Z axis pulse motor 14 or the X axis pulse motor 22 so that the Z axis feed screw 16 or the X axis feed screw 24 is rotated by a certain angle in response to each received pulse so as to control the feed of the edge of the cutting tool 18.

Next the command informations of the machining program will be more elaborated. As described above, the command informations include machining operation command informations which command kinds of machining operations of the cutting tool 18, and the feed amount command informations which command a feed amount of the cutting tool 18.

The machining operation command informations includes, e.g., GO0 (positioning (rapid feed)), GO1 (linear compensation)), (arcuate compensation (clockwise compensation)) and GO3 (arcuate compensation (counter clockwise revolution)).

GO0 is a command for feeding the cutting tool 18 directly to a required position and is used at the start of a cutting. No cutting is made at this command.

GO1 is a command for linearly forwarding the cutting tool 19 from one position to another, causing the cutting tool 18 to make a cutting operation.

GO2 is a command for causing the cutting tool 18 to cut arcuately clockwise from one position to another.

GO3 is a command for causing the cutting tool 18 to cut arcuately counter clockwise from one position to another.

The feed amount command informations include an increment command for commanding a feed amount in accordance with an increment of a coordinate position, and an absolute command for commanding a feed amount in accordance with the absolute values of a coordinate position. X and Z indicate the address of an absolute command. X indicates a position along the X axis, and Z indicates a position along the Z axis. U and W indicate the address of an increment command. U indicates a feed amount along the X axis, and W indicates a feed amount along the Z axis. I and K indicate the address of a radial increment command. I indicates a distance from the starting point of and arc to the center thereof along the X axis, and K indicates a distance from the starting point of an arc to the center thereof along the Z axis.

Next the machining based on the machining blueprint of FIG. 2 using the control apparatus for an NC machine tool according to this embodiment will be explained.

Figure 2:
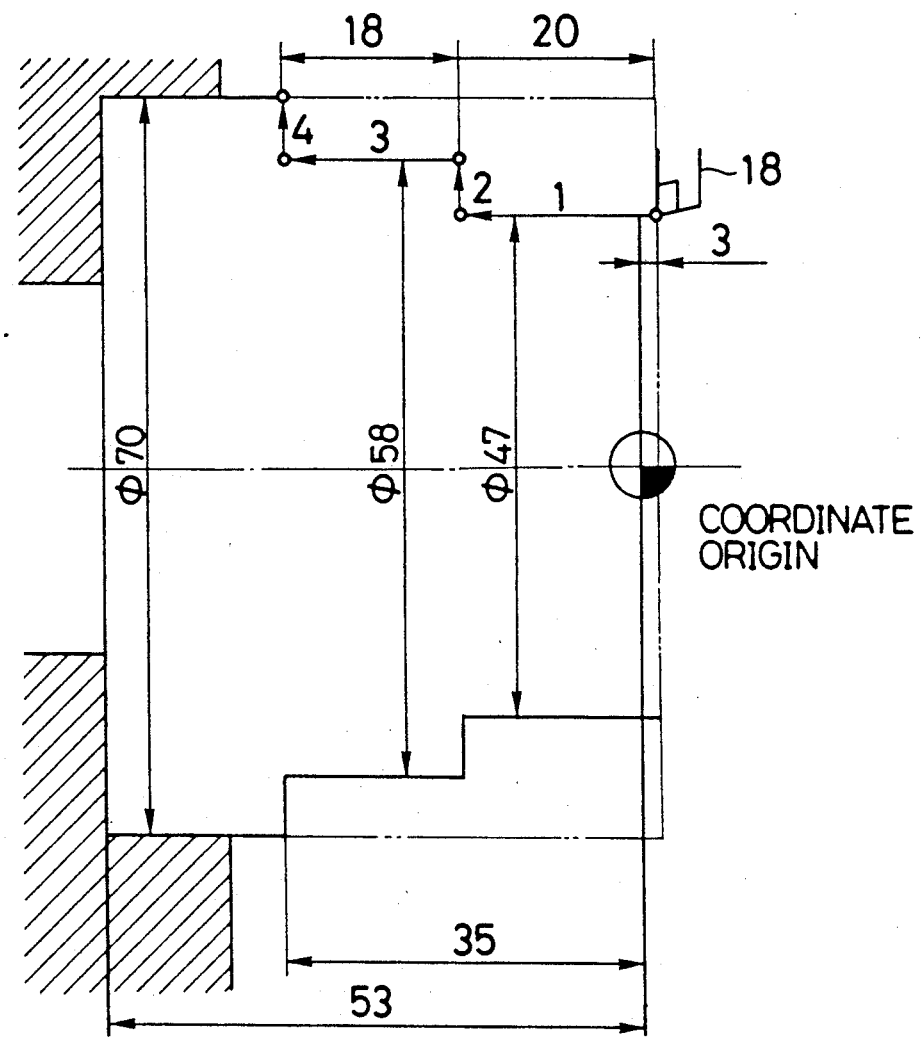
FIG. 2 is a view showing one example of blueprints of a workpiece.

When the blueprint of FIG. 2 is completed, a machining program is prepared in accordance with the blueprint. FIG. 3 shows an example of the machining program. As shown in FIG. 3, three kinds of machining programs are possible for the same operation. Example 1 of the machining programs is based on the increment command alone, Example 2 is based on the absolute command alone. Example 3 is based on both the increment and the absolute commands. Examples 1, 2 and 3 are written in a program memory 52 as the command informations of FIG. 4. Each block of the command informations comprises five elements. A first element is an information indicative of a kind of the feed commands, a second element being an information indicative of a kind of the machining operations, the third element being an information indicative of the X axis value of a coordinate, the fourth element being an information indicative of the Z axis value of a coordinate, and a fifth element being an information indicative of a speed of a machining operation. The machining program of FIG. 2 has five blocks.

In Block 1, a feed amount is commanded in a minutely feed amount; the cutting tool 18 is fed to a coordinate (X,Z)=(47, 3) at a speed of F=10000 mm/min.

In Block 2, a feed amount is commanded in a feed amount per one revolution of the main spindle; the cutting tool 18 is cutting fed to a coordinate (X,Z)=(47, 17) at a speed of F=0.1 mm/rev. (Tool position 1).

In Block 3, a feed amount is commanded in a feed amount per one revolution of the main spindle; the cutting tool 18 is cutting fed to a coordinate (X,Z)=(58, 17) at a speed of F=0.1 mm/rev (Tool position 2).

In Block 4, a feed amount is commanded in a feed amount per one revolution of the main spindle; the cutting tool 18 is cutting fed to a coordinate (X,Z)=(58, 35) at a speed of F=0.1 mm/rev.

In Block 5, a feed amount is commanded in a minutely feed amount; the cutting tool is cutting fed to a coordinate (X,Z)=(70, 35) at a speed of F=200 mm/min (Tool position 4).

When command informations such as shown in FIG. 4 have been stored, a test machining is performed to check whether or not the machining program contains any errors. For the performance of the test machining, the mode switch 50 is switched to the test mode. A test mode signal is supplied from the mode switch 50 to the switching circuit 38 and the main control circuit 48. When the switching circuit 38 receives the test mode signal, the switching circuit 38 supplies a pulse from the manually operated handle 40 to the main control circuit 48. Then the numerical control unit 46 operates in response to the pulse from the manually operated handle 40 in stead of that from the main spindle rotational position detecting pulse 35. Accordingly, in the test machining, G98, which is a minutely feed amount command, is automatically converted into G99, which command a feed amount per one revolution of the main spindle. The speed of the forward feed is set at a fixed value of 10 mm/rev, and the minutely feed speed is multiplied with a suitable constant (e.g., 1/1000). For example, 200 mm/min becomes 0.2 mm/rev. In the test machining, the pulse from the feed pulse generator 56 is ignored.

When an operator turns the manually operated handle 40, a pulse is generated corresponding to the rotational speed of the handle 40. In synchronization with the pulse, the main control circuit 48 executes the machining program stored in the program memory 52. In the case of the machining program of, e.g., FIG. 4, firstly the Z axis pulse motor 14 and the X axis pulse motor 22 are actuated to forward the cutting tool 18 to the coordinate (47, 3 ) at a speed of 10 mm/rev. This feed corresponds to a rotational speed of the manually operated handle turned by the operator. The operator manipulates the manually operated handle 40, watching an actual motion of the cutting tool 18; if the cutting tool nearly collides with the workpiece due to an error of the machining program, the operator stops turning the manually operated handle 40 to prevent the collision. Then the error is corrected, and the test machining is restarted. After repeating such procedure, a correct machining program is completed.

The execution speed of the machining program can be changed by changing the rotational speed of the manually operated handle 40, and by turning the manually operated handle 40 reversely, the machining program can be reversed.

Next the reverse execution of the machining program will be explained.

Figures 5, 6:
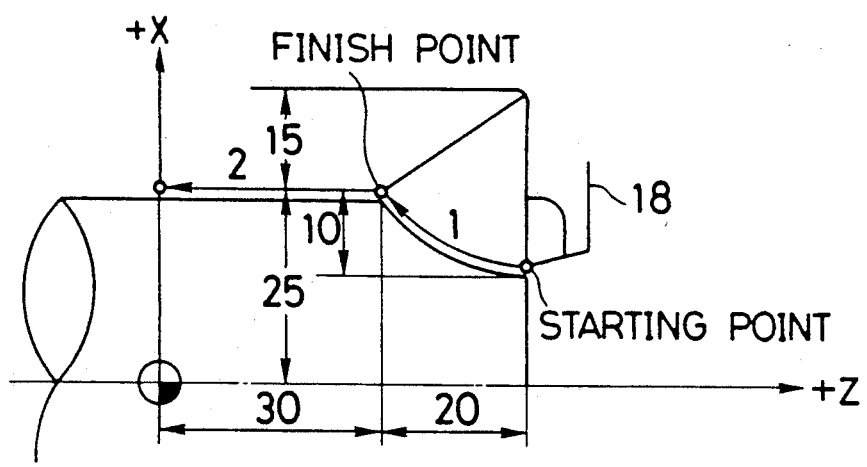
FIG. 5 is a view showing command informations of the machining program of FIG. 3 for a reverse machining operation.
FIG. 6 is a view showing another example of blueprint of another workpiece.

The rotational direction of the manually operated handle 40 is judged by the direction judging and multiplying circuit 42, and a signal indicating the rotational direction is inputted to the main control circuit 48. When the manually operated handle 40 is turned reversely, a reverse direction signal is inputted to the main control circuit 48. The main control circuit 48 prepares a new reverse execution block, based on the machining program. The reverse execution block is prepared, based on a current block and last block. For example, in preparing a reverse execution block during an execution of Block 3, as seen in FIG. 5, GO1 of Block 3 is used for a kind of machining operations (cutting feed), X=47.0, Z=17.0 of Block 2 being used for a coordinate, and F=0.1 mm/rev of Block 3 being used for a machining operation speed. Then the thus prepared block is executed; the operation of the Block 3 is performed toward Tool position 2 of FIG. 2, performing the machining operation reversely.

When the test machining is over in this way, and a machining program is completed. The mode switch 50 is switched to a normal machining mode for the automatic machining, and the workpiece is machined.

Next, an arcuate cutting machining based on the machining blueprint of FIG. 6 using the control apparatus for use in an NC machine tool according to this embodiment will be explained. When the machining blueprint of FIG. 6 is completed, a machining program exemplified in FIG. 7 is prepared, based on the blueprint. In this machining program, GO2 indicates a clockwise arcuate cutting, and the finish points are commanded by X and Z. But X commands a diameter in the direction of the X axis. I and K indicate the center of an arc, and I commands a distance (a radius value) from the starting point of the arc to the center of the arc in the direction of the X axis, and K commands a distance from the starting point of the arc to the center of the arc in the direction of the X axis.

Based on this machining program, the command informations of FIG. 8 are stored in the program memory 52. These command informations are basically the same as those of FIG. 4 but, for an arcuate cutting, additionally include coordinate values indicating a finish point of the arcuate cutting, and a fifth element commanding a radius of the arc.

When the mode switch 50 is switched to the test mode, a test machining performed in synchronization with a rotational speed of the manually operated handle 40 in the same way as the previously described machining when the manually operated handle 40 is turned clockwise. The arcuate cutting performed when the manually operated handle 41 is turned counter clockwise is a little different from the previously described machining. For example, when the manually operated handle 40 is turned reversely during an execution of Block 2, the main control circuit 48 automatically generates, based on blocks 1 and 2, the reverse operation block shown in FIG. 9, in which the kind of machining operation is GO3 corresponding to GO2 of Block 2 (clockwise cutting feed), the coordinate being X=30.0, Z=50.0, the center of the arc being I=25.0 K=0 of Block 2, and the speed being F=0.3 mm/rev of Block 2, and then executes the reverse operation block. Then, the feed is made based on Block 2 toward the starting point, and the reverse machining operation is performed. In performing such reverse arcuate cutting, a clockwise arcuate cutting is made counter clockwise cutting, and a counter clockwise arcuate cutting is made a clockwise arcuate cutting.

As described above, according to the embodiment, a test machining can be performed synchronously with a manipulation of the manually operated handle. This permits an operator to perform a test machining at a proximate speed turning the manually operated handle, watching cutting conditions. This affords the operator to stop the machining in case of a danger, and besides, the test machining can be reversed by turning the manually operated handle reversely. That is, the test machining can be performed by the manipulation of the manually operated handle.

This invention is not limited to the above described embodiment and cover various modifications and variations without departing from the scope of the claims. The invention has been described above by means of an embodiments in which this invention controls the NC lathe, but may be used in controlling other NC machine tools.

What is claimed is:

1. An NC machine tool control method for controlling an NC machine tool in accordance with a machining program by a pulse synchronized with a revolution of a main spindle in a machining mode where a normal machining is performed in which:
   a manually operated handle is rotated to generate a pulse of a user controlled speed in a test machining mode where a test machining is performed, in place of the pulse synchronized with a revolution of the main spindle, whereby the NC machine tool is controlled in accordance with said machining program by the pulse generated by the manually operated handle.

2. An NC machine tool control method according to claim 1, in which:
   said manually operated handle is rotatable clockwise and counterclockwise, and generates a clockwise pulse or a counterclockwise pulse in accordance with a rotational direction, and
   in said test machining mode, said clockwise pulse or said counterclockwise pulse, of a selective speed generated by said manually operated handle is used instead of the pulse synchronized with said main spindle so that, in response to the clockwise pulse, said NC machine tool is controlled in a sequence of normal machining steps of said machining program, and, in response to the counterclockwise pulse, said NC machine tool is controlled in a reverse sequence of normal machining steps of said machining program.

3. An NC machine tool control method according to claim 2, in which:
   a multiplying rate of a controlled speed of said NC machine tool is set with respect to a rotational speed of said manually operated handle, and
   the pulse from said manually operated handle is multiplied by said multiplying rate.

4. An NC machine tool control method according to claim 1, in which:
   a multiplying rate of a controlled speed of said NC machine tool is set with respect to a rotational speed of said manually operated handle, and
   the pulse from said manually operated handle is multiplied by said multiplying rate.

5. An NC machine tool control apparatus for controlling an NC machine tool in accordance with a machining program by a pulse syncrhonized with a revolution of a main spindle in a machining mode where a normal machining is performed, comprising:
   a manually operated handle which is turned to generate a pulse at a user controlled speed; and
   switching means for switching to the pulse synchronized with a revolution of the main spindle in the machining mode and switching to the pulse generated by the manually operated handle in a test machining mode where a test machining is performed,
   the NC machine tool being controlled in accordance with said machining program by either of the pulses selected by the switching means.

6. An NC machine tool control apparatus according to claim 5, wherein
   said manually operated handle is rotatable clockwise and counterclockwise, and generates a clockwise pulse or a counterclockwise pulse of a selective speed,
   there is provided judging means for judging a rotational direction of said manually operated handle;
   in said test machining mode, when said judging means judges said pulse clokwise, said NC machine tool is controled in a sequence of normal machining steps of said machining program, and said NC machine tool is controlled in a reverse sequence of normal machining steps of said machining program, when said judging means judges said pulse counterclockwise.

7. An NC machine tool control apparatus according to claim 6, wherein said apparatus comprises
   multiplying rate setting means for setting a multiplying rate of a controlled speed of said NC machine tool with respect to a rotational speed of said manually operated handle, and
   multiplying means for multiplying the pulse from said manually operated handle by the multiplying rate set by said multiplying rate setting means and supplying the pulse to said switching means.

8. An NC machine tool control apparatus according to claim 5, wherein said apparatus comprises
   multiplying rate setting means for setting a multiplying rate of a controlled speed of said NC machine tool with respect to a rotational speed of said manually operated handle, and
   multiplying means for multiplying the pulse from said manually operated handle by the multiplying rate set by said multiplying rate setting means and supplying the pulse to said switching means.

* * * * *